Aug. 23, 1932.   J. R. McWANE   1,872,781
BELL AND SPIGOT JOINT
Original Filed Feb. 27, 1930   4 Sheets-Sheet 2

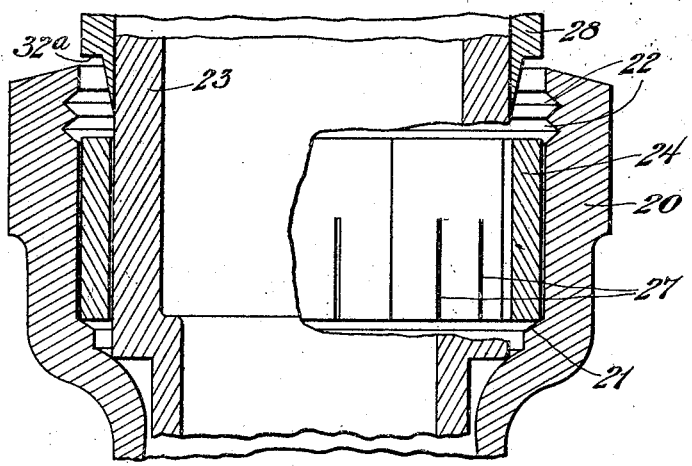
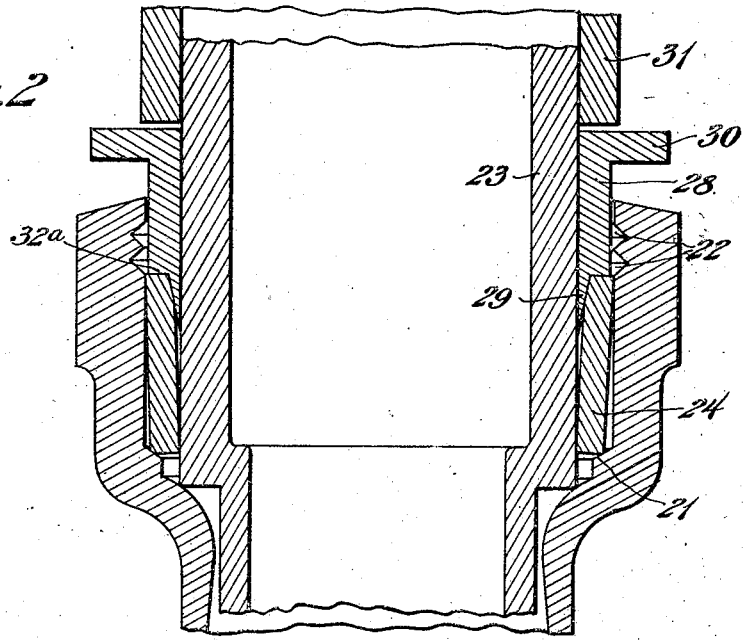
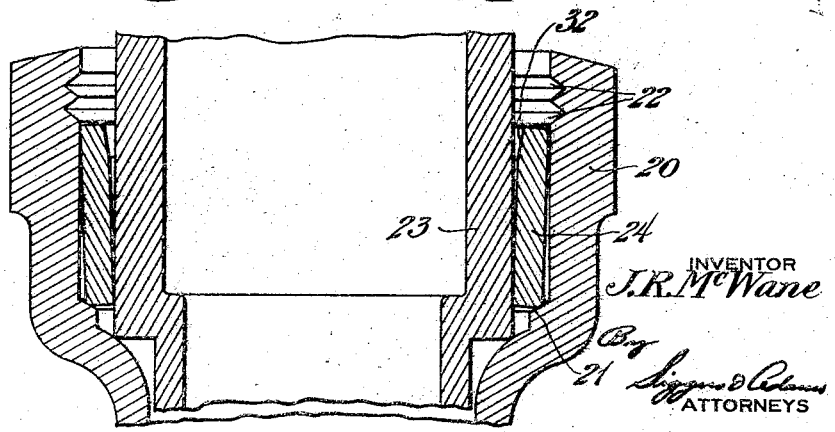

INVENTOR
J. R. McWane
BY
Siggers & Adams
ATTORNEYS

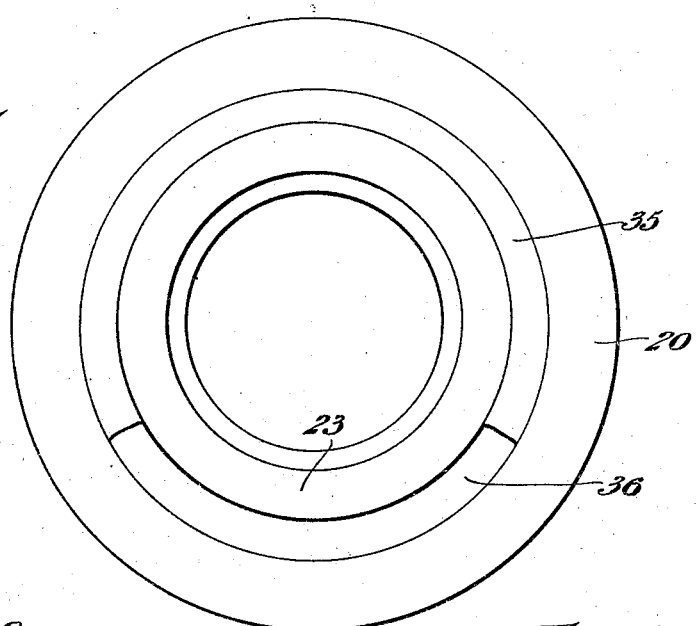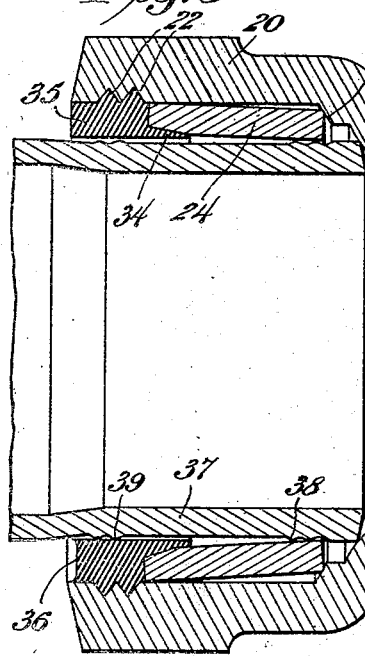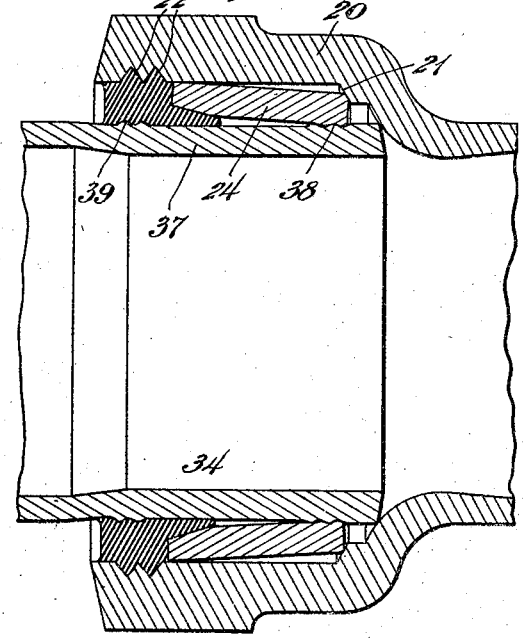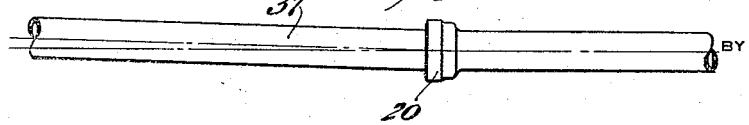

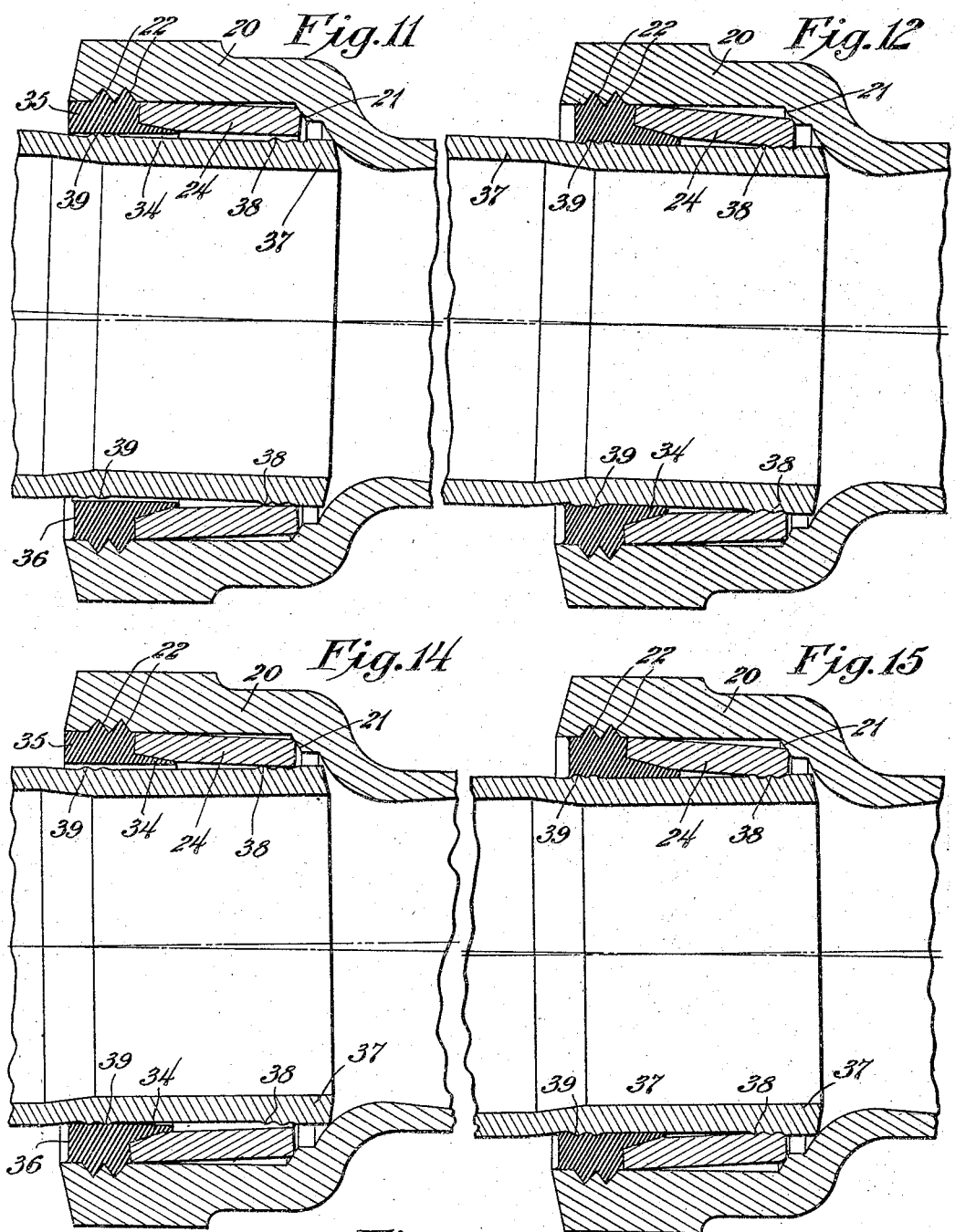

Patented Aug. 23, 1932

1,872,781

UNITED STATES PATENT OFFICE

JAMES R. McWANE, OF BIRMINGHAM, ALABAMA, ASSIGNOR TO McWANE CAST IRON PIPE COMPANY, OF BIRMINGHAM, ALABAMA, A CORPORATION OF ALABAMA

BELL AND SPIGOT JOINT

Application filed February 27, 1930, Serial No. 431,859. Renewed July 6, 1932.

This invention relates to calked bell and spigot pipe joints and the method of making the same. More specifically, it involves prepared joints of the wooden wedge or block type and the mode of assembling or preforming the joint materials or packings at the factory so that the calking operation in the field is greatly simplified and expedited. Among other objects, it aims to provide greatly improved and effective prepared joints utilizing novel filler blocks or wedges in the packing space to economize with the more expensive calking lead. Another aim is to preform and assemble the novel joint materials in such manner as to obviate the necessity of calking underneath the spigot when in the field, thereby dispensing with bell holes which are generally dug in pipe ditches to afford access to the joints.

In general, this application involves important improvements in the pipe joints disclosed in my Patents Nos. 1,270,309, 1,288,092 and 1,486,777, as well as in my application, Ser. No. 167,509, filed February 11, 1927.

Other objects and advantages of the invention will appear in the specification, when considered in connection with the accompanying drawings, wherein:

Figs. 1 to 6 inclusive are sectional views showing successive stages of assembling the preferred joint materials about a mandrel in a pipe bell;

Fig. 7 is an end view showing the joint materials before the mandrel is removed;

Fig. 8 is a sectional view showing a spigot inserted in a bell ready to be calked;

Fig. 9 is a sectional view showing a completed joint with the pipe sections in axial alinement;

Fig. 10 is a side elevation, on a reduced scale, showing jointed pipe sections wherein the axes of the sections are at a small angle to each other;

Fig. 11 is an enlarged vertical sectional view of the joint shown in Fig. 10, but showing the spigot inserted in the bell before the joint is calked;

Fig. 12 is a sectional view similar to Fig. 11 but showing the completed joints;

Figs. 13, 14 and 15 are views similar to Figs. 10, 11 and 12, but showing the pipe sections having their axes at an angle opposite to that in Fig. 10;

While the pre-calked joints of the block or wedge type shown in my aforesaid patents and application have been entirely practicable and resulted in a great saving of calking lead, all of them have been subject to certain drawbacks or disadvantages. Some of the difficulties have arisen in the field and will be mentioned merely to emphasize the importance of the improvements involved in this application.

Figure 4:
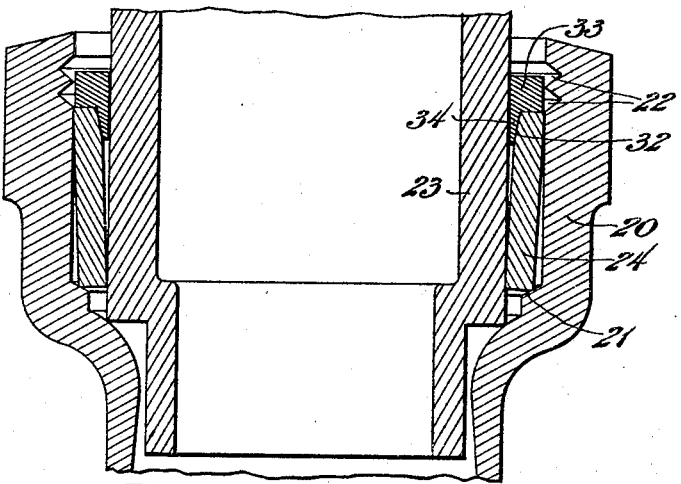
Figure 5:
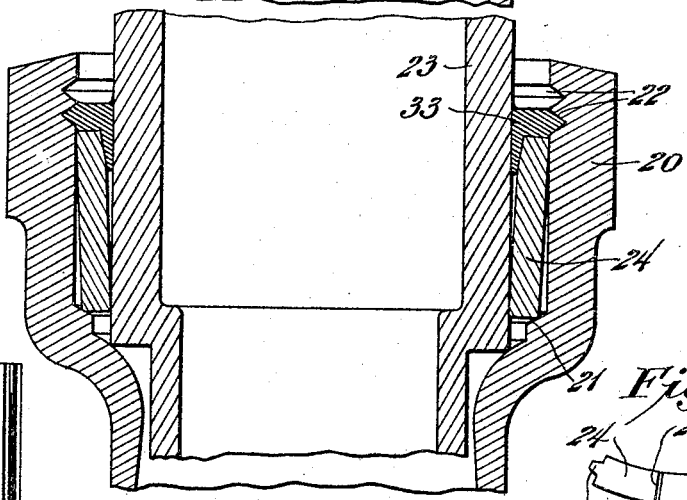
Figure 16:
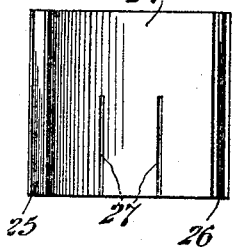
Fig. 16 is a side elevation of an arcuate wooden block.

Referring to my Patents 1,270,309 and 1,288,092, both of which disclose rings of narrow metal blocks seated against the bottom of a bell, one of the difficulties experienced with them was that the narrow blocks would occasionally drive down beyond the spigot and enter the pipe, especially when the spigot happened to be inserted or turned at the maximum angle upon entering the bell as illustrated in Figs. 9 and 10 of the former patent and Fig. 4 of the latter.

Referring to my Patent 1,486,777 and to the aforesaid application, wherein a series of blocks were seated against a fibrous packing at the bottom of the bell, the idea was to precalk the lead about half way around the mandrel to obviate the necessity of doing any calking of consequence in the field, underneath the spigot, and thus to dispense entirely with the necessity for digging bell holes. However, experience has demonstrated that the pre-calked portions of the joint almost invariably required touching up with a double offset calking tool, such as shown in Fig. 7 of the patent. Furthermore, there have been some instances in which the touching up operation with an offset tool would not make a tight joint. Hence, the idea of entirely dispensing with bell holes was abandoned because of the paramount importance of making sure that all of the joints are properly calked all around and made watertight.

In the last mentioned patent and application, the jute packing is open to the objection that when it gets wet before it is used, it swells up and has a tendency to prevent the spigot from going home and seating in the bottom of the bell. Another trouble is that, when the spigot of the pipe section is inserted in the bell slightly out of alinement with it, the end of the spigot is fouled on one side with the jute, even if the jute does not swell.

The present invention aims to provide an improved, pre-calked joint and mode of making the same which is not subject to any of the foregoing difficulties or objections, one of the important features being the method of pre-calking a small portion of the calking lead so as to eliminate the necessity for digging bell holes in the pipe ditches. Another important feature is the provision of improved, wooden wedges or blocks which eliminates the possibility of the wedges being driven into the pipe by the spigot when the spigot is inserted at its maximum angle in a bell and which are self-tightening when water-soaked. Also, the new mode of assembling or forming the joint packing materials in the bell insures a tight joint with a minimum amount of field calking.

Referring particularly to the drawings, the preferred joint materials are shown as being applied to a pipe bell 20 which has an inclined seat or shoulder 21 at the base and spaced, annular lead-receiving grooves 22 adjacent to the mouth. These parts are preferably made when the pipe is cast and require no special machining. Otherwise, the bell may be of the usual design.

In Figs. 1 to 6 inclusive, the preferred joint materials are shown as being assembled within the bell about a mandrel 23 of the type shown in my aforesaid application, the same being slightly larger than a spigot so that ample clearance is provided for insertion of the spigot without binding.

Figure 17:
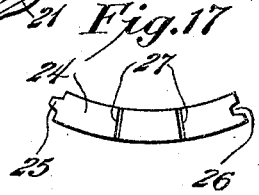
Fig. 17 is a lower end view of the wooden block shown in Fig. 16.

In this example, a ring of relatively wide, arcuate wooden blocks or wedges 24 is first inserted in the bell about the mandrel. These blocks are preferably interlocked at their abutting edges by tongues 25 and grooves 26 (Fig. 17) and each one has one or more kerfs or saw cuts 27 extending to about the middle of its length to permit the inner ends to be contracted or wedged radially inwardly against a spigot. Initially, both ends of the blocks are square and all of them are preferably alike. The curvature of the blocks is such that they will fit in bells of a given size.

After the ring of blocks is inserted, it is driven endwise against the inclined seat or shoulder 21 in the bell and radially outwardly against the bell at the outer end by means of cylindrical tool 28 which has a wedge-shaped or frusto-conical portion 29 at its inner edge projecting downwardly from the lower end (Figs. 1 and 2). This tool is shown as having a radial annular flange 30 to facilitate its removal from the mandrel and it is adapted to be driven against the blocks by a cylindrical sleeve 31 which works loosely on the mandrel. Now, the frusto-conical end 29 of the tool engages the inner edges of the blocks and wedges them outwardly against the bell, at the same time producing corresponding tapering or inclined faces 32 on the inner sides of the blocks by compressing their ends against the bell. When the square shoulders 32$^a$ strikes the squared ends of the blocks, it drives them against the beveled seat 21 and squeezes or crowds their inner ends against the mandrel slightly battering their outer peripheral edges against the seat. The kerfs or saw-cuts 27 permit the inner ends of the blocks to be sprung or squeezed inwardly as shown. Thus, the blocks are set in place to engage a spigot at their inner ends and the bell at their outer ends. The outer ends act as abutments for calking lead, preventing any lead from being squeezed or driven between them and the bell; while the inner beveled faces provide an annular wedge-shaped calking space to receive calking lead which, when calked, will further force the outer ends tightly against the bell.

The next step in the assembling operation is to insert in the bell a pre-formed or cast lead ring 33 having an annular frusto-conical inner end or flange 34 which is adapted to be forced between the beveled faces 32 of the blocks, and the mandrel 23. This ring is also shown as having an annular, square shoulder to be seated against the outer square ends of the blocks (Fig. 4). The lead ring is then calked (see Fig. 5) so as to wedge all of the blocks outwardly against the bell at their outer ends and drive them endwise farther against their seats. The lead spreads laterally into one or more of the annular bell grooves 22 and against the mandrel, at the same time being driven farther inwardly between the beveled inner faces of the blocks and the mandrel. Since the calked lead ring provides a seal or dam beyond or above the outer ends of the blocks, the mouth of the bell may now be completely filled with molten calking lead 35, as shown in Fig. 6, it being understood that the pipe is standing upright while this is done.

Figure 6:
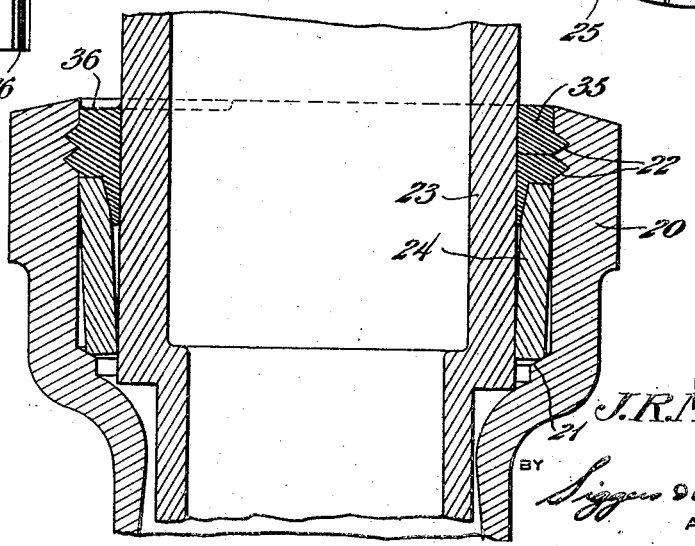

Referring to Figs. 6 and 7, the poured lead 35 is there shown as being pre-calked at 36 around about one third the circumference of the bell, this portion being intended to lie in the bottom of the pipe ditch where it is inaccessible without a bell hole. This preliminary calking tightens all of the joint materials about the mandrel and shifts the mandrel to an eccentric position in the bell (Fig. 6). Likewise, a spigot will be slightly eccentric with respect to the bell before the field calking is done. However, since this type of joint requires no field calking around the pre-calked portion below the spigot, the field calking around the accessible, uncalked portion will wedge the spigot into a concentric position within the bell, bringing it into proper alinement with the bell section, this lateral shifting of the spigot being essential to make a tight joint at the bottom of the spigot against the pre-calked portion. This is one of the important advantages derived from using the wedge-shaped lead ring in conjunction with the beveled inner faces of the blocks.

Referring to Figs. 8 and 9, illustrating the process of making a field joint wherein the pipe sections are perfectly alined, the inserted spigot 37 is shown as having small, spaced sets of grooves provided by annular beads 38 and 39 protruding slightly from the outer surface so that the beads 38 and their intervening grooves lie adjacent to the inner surfaces of the blocks 24 at their inner ends and the beads 39 are adjacent to the inner surface of the calking lead. It will be observed that the external diameter of the spigot in the vicinity of the annular beads and between them is slightly reduced so that the external diameter of the beads is no greater than the normal diameter of the spigot. This prevents the beads from binding against or fouling the joint materials upon insertion. As has already been intimated, the uncalked portion of the calking lead is calked about the inserted spigot with an ordinary calking tool and the accessible portion of the pre-calked portion is merely touched up; while the extreme bottom portion below the spigot is left untouched. The result is a perfectly calked joint with the pipe sections properly alined (Fig. 9).

The spaced sets of grooves and beads serve a two-fold purpose in making tight joints. In the first place, the driving of the blocks forces them radially inwardly, to a certain extent, into the grooves or beads 38 at the inner end of the bell, and the subsequent swelling of the wedges, when water-soaked, still further causes the fiber of the wood to fill the grooves, firmly imbedding the blocks therein. This helps to prevent the pipe sections from blowing off when one end happens to be unrestrained. In the second place, the top or outer set of grooves and beads 39 not only imbed themselves in the calking lead when it is driven down but, also, they produce a better seal at the bottom or pre-calked portion of the joint. It has been found that, when the surface of the spigot is corrugated, it is easier to get a perfect seal, because the ridges or beads cut into the lead and seal to much better effect than would be possible if the spigot were perfectly smooth.

Referring further to Fig. 9, it will be noted that the effect of the calking around the uncalked portion of the joint is to force the inner ends of the wedges or blocks 24 radially against the beads 38 so that the beads are partially imbedded in the wood. As the blocks around the upper major portion of the spigot are driven endwise, their inner ends wedge against and force the spigot downwardly, the lower portion of the spigot pressing against and partially imbedding the beads in the blocks around that portion. The field-calked portion of the lead spreads against the beads 39 around the upper portion of the spigot and the downward pressure against the spigot also causes the lower portions of these beads partially to imbed themselves in the pre-calked lead at the bottom of the spigot. The entire inner surface of the pre-calked portion of the lead is sealed against the surface of the spigot due to the wedging and shifting action upon final calking. As a matter of fact, the joint, immediately below the spigot, is made as tight as if the lower portion were again calked in the field. A joint made in this manner has withstood an enormous hydraulic pressure before it ruptured or failed.

The ring of wooden wedges is subjected to the swelling action or influence of the water or liquid in the pipe after the joint is completed. They are conveniently made of untreated redwood or cypress so that they will swell when saturated or water-soaked. As has been stated, this swelling causes the inner ends of the blocks to grip more firmly against and further imbed themselves between the beads at the end of the spigot. The beveled outer ends of the blocks also force the wedge-shaped portion of the lead tighter against the spigot. Any slight lengthwise or longitudinal swelling of the blocks will also tend to further tighten their grip and the grip of the lead on the spigot. Hence, the improved joints are self-tightening and the pipe sections are more securely locked and held together after they are put in use.

In Figs. 10, 11 and 12, the spigot section is shown as being inserted and calked with its axis at a slight angle to the axis of the bell section. It will be noted in Fig. 11 that the end of the spigot contacts with the upper portion or base of the bell; while the lower portion of the spigot presses against the inner ends of the blocks and the beads 39 contact with the inner surface of the calking lead in the upper portion of the bell. The beads 38 on the upper side of the spigot are slightly spaced from the inner ends of the blocks and the beads 39 on the lower side of the spigot are slightly spaced from the inner surface of the pre-calked lead.

When the field calking is done, the blocks around the upper portion of the spigot are driven endwise and wedged laterally and inwardly against the beads 38, at the same time forcing the spigot downwardly and imbedding the lower portion of the beads 38 in the blocks at the bottom of the bell. As the spigot is forced laterally and downwardly against the lower blocks, the ends of the blocks are forced radially outwardly on the beveled shoulder, thus slightly shifting the blocks lengthwise toward the mouth of the bell against the calking lead. The slight lengthwise shifting of the blocks forces the wedge-shaped portion 34 of the calking lead radially inwardly toward the spigot. Simultaneously, the calking action on the lead at the upper portion of the joint forces the spigot downwardly against the pre-calked lead as hereinbefore described, imbedding the beads 39 in the lead. Thus, the blocks are utilized to produce a tight joint between the pre-calked bottom portion of the lead ring and the spigot, insuring sealing contact between the lead and the spigot throughout the width of the ring.

In Figs. 13, 14 and 15, the spigot section is inserted in the bell with the axes of the sections at the opposite angle from that shown in Figs. 10, 11 and 12. In this example, the beads 38 around the upper portion of the spigot contact with the inner end portions of the blocks and the beads 39 around the lower portion of the spigot contact with the inner surface of the pre-calked portion of the lead. The field calking first spreads the lead ring against the upper portion of the spigot and forces it downwardly, imbedding the beads 39 deeply into the pre-calked portion of the lead ring. This pressure is greatly increased by the simultaneous downward wedging action of the inner ends of the blocks 24 against the end of the spigot. All of the pressure is transmitted initially to said pre-calked lead, thus spreading the lead so that the whole spigot moves downwardly. As the lead spreads inwardly of the bell, it pushes or forces the lower blocks endwise and causes the inner ends to move slightly radially and inwardly on the beveled shoulder 21. The beads 38 around the bottom of the spigot are simultaneously forced into contact with the inner ends of the blocks and imbed themselves in the wood as shown in Fig. 15.

While the two illustrated angular positions of the pipe sections are shown as lying in a vertical plane, it will be understood that the angles may lie in other planes and that the field calking of such joints will be equally as effective to produce tight joints without additional calking of the pre-calked lead which is always put in the bottom of a pipe ditch.

From the foregoing description, it will be seen that the mode of assembling and pre-forming the joint material at the plant is greatly simplified; that the improved arcuate wooden wedges or blocks not only effect a great saving in relatively expensive calking lead, but also, assist in producing a tight joint during the field calking operation; that the construction and arrangement is such that they effectively lock a spigot within a bell and prevent the pipe sections from blowing apart; and that the joints may be calked very quickly in the field without further calking of the pre-calked portions directly under the spigots, thus avoiding the heavy expense of digging bell holes in the pipe ditches. In addition to effecting a great saving of time, labor and expense in completing the joints in the field, the completed joints actualy improve or become self-tightening when the blocks swell after being water-soaked.

Having described the preferred form of joint and the method of making the same, it is to be understood that the invention is capable of many different embodiments. Moreover, it is not indispensable that all of the steps of the described method or all of the features shall be used conjointly, since they may be used in different combinations and sub-combinations.

What is claimed is:

1. A pre-formed joint packing for bell and spigot pipes comprising, in combination, a ring of wooden blocks interlocked with each other along their longitudinal edges and inserted endwise in the bell; and calking material in the mouth of the bell seated on the outer ends of said blocks.

2. A pre-formed joint packing for bell and spigot pipes comprising, in combination, a ring of relatively wide elongated wooden blocks of arcuate cross-section inserted endwise in the bell and conforming approximately to the curvature thereof; adjacent blocks being interlocked with each other along their longitudinal edges; and a ring of calking material in the mouth of the bell seated on the outer ends of said blocks.

3. A pre-fomed joint packing for bell and spigot pipes comprising, in combination, a ring of arcuate wooden blocks seated in the bell and having interlocking means at their adjacent longitudinal edges; and a ring of calking lead in the mouth of the bell presenting an annular shoulder seated on the outer ends of the blocks and an inwardly tapered annular flange on the lead ring contacting with the inner faces of said blocks.

4. In a pre-calked bell and spigot joint of the class described, a ring of wooden blocks inserted in the bell, said blocks having side edges which are interlocked throughout their lengths.

5. In a pre-calked bell and spigot joint of the class described, a ring of elongated, wooden blocks inserted in the calking space; each block being arcuate in cross-section and interlocked at its opposite side edges with the adjacent blocks.

6. In a pre-calked bell and spigot joint of the class described, a ring of elongated wooden blocks inserted in the calking space; each block being arcuate in cross-section and all of said blocks having interlocking tongues and grooves at their opposite side edges.

7. In a pre-calked bell and spigot joint of the class described, a ring of wooden blocks of arcuate cross-section inserted in the calking space and adapted to be wedged radially inwardly at their inner ends against the spigot; said blocks having longitudinal kerfs at their inner ends to permit contraction of the ring when the joint is completed.

8. In a pre-calked bell and spigot joint of the class described, a ring of wooden blocks of arcuate cross-section inserted in the calking space and seated at their inner ends in the bottom of the bell; said blocks being interlocked along their longitudinal edges and having longitudinal kerfs at their inner ends to permit contraction of the ring about the end of the spigot when the joint is completed.

9. In a bell and spigot joint of the class described, a bell having an annular beveled shoulder at its base; a ring of wooden blocks of arcuate cross-section seated at their inner ends against said beveled shoulder; said blocks having longitudinal kerfs extending from their inner ends to points about midway their lengths and being wedged inwardly against the end portion of the spigot; and a ring of calked lead in the mouth of the bell seated against the outer ends of said blocks and against the spigot.

10. In a bell and spigot joint of the class described, a bell having an annular beveled shoulder or seat at its base; a ring of wooden blocks of arcuate cross-section seated at their inner ends against said beveled shoulder; said blocks having interlocked tongues and grooves at their side edges and longitudinal kerfs in their inner ends; and a ring of calked lead in the mouth of the bell presenting a shoulder seated against the outer ends of said blocks and an inwardly tapered annular flange between the blocks and the spigot whereby the inner ends of the blocks are wedged radially inwardly against the spigot and their outer ends are expanded radially outwardly against the bell.

11. In a bell and spigot joint of the class described, an inwardly beveled shoulder at the base of the bell; a ring of wooden wedges of arcuate cross-section seated against said shoulder; said wedges having longitudinal kerfs cut in their ends; a ring of calked lead in the mouth of the bell having a shoulder driven endwise against the outer ends of said wedges and wedging their inner ends radially inwardly against the spigot; beads on the spigot into which the inner faces of the wedges at their inner ends are imbedded; and means on the bell and spigot interlocking with the ring of calked lead to prevent outward displacement thereof.

12. In a bell and spigot joint of the class described, a beveled shoulder at the base of the bell; a ring of wooden blocks seated at their inner ends against said shoulder and contracted radially inwardly against the spigot; interlocking connections between the longitudinal side edges of the blocks; said ring of blocks being expanded radially outwardly at their outer ends against the bell and presenting at said outer ends beveled faces opposed to the spigot; and a ring of calked lead outside the ring of blocks and having a wedge-shaped annular flange between said beveled faces and the spigot.

13. A pipe joint of the class described, comprising, in combination, a bell having an annular beveled shoulder adjacent to its inner end and annular lead-receiving grooves adjacent to its mouth; a spigot seated in the bell; a ring of wooden wedges seated at their inner ends against said shoulder and wedged radially inwardly against the spigot; said wedges having longitudinal kerfs at their inner ends to permit contraction of the ring against the spigot; beveled faces formed on the inner sides of said wedges at their outer ends providing an annular wedge-shaped calking space between the wedges and the spigot; the outer ends of the ring of wedges being forced outwardly against the inner surface of the bell; a ring of calked lead in the mouth of the bell presenting an annular shoulder seated against the outer ends of the wedges and being spread outwardly into the lead-receiving grooves; and an annular wedge-shaped portion on said lead ring calked against the inner beveled faces of the wedges and wedged thereby against the outer wall of the spigot.

14. A pipe joint of the class described comprising, in combination, a bell having an annular beveled shoulder adjacent to its inner end and annular lead-receiving grooves adjacent to its mouth; a spigot seated in the bell and presenting protruding spaced beaded portions opposed to the beveled shoulder portion of the bell and to said lead-receiving grooves; a ring of wooden wedges which are interlocked along their longitudinal edges with each other, said wooden wedges being seated endwise against said beveled shoulder and wedged radially inwardly against the adjacent beads so that said beads are partially imbedded in the inner faces of said wedges; beveled faces formed on the inner sides of the wedges at their outer ends providing a wedge-shaped calking space between the wedges and the spigot; the outer ends of the ring of wedges being forced radially outwardly into contact with the inner surface of the bell; a ring of calked lead in the mouth of the bell seated on the outer ends of the wedges and spread laterally into and against said grooves and the opposed beads; and an annular wedge-shaped portion on the said lead ring calked against the inner beveled faces of the wedges and wedged thereby against the outer wall of the spigot.

15. That method of forming a prepared or pre-calked packing in a pipe bell having an annular beveled shoulder at its base which is characterized by inserting a mandrel of slightly larger diameter than a spigot in the bell; inserting a plurality of wooden wedges in the bell about the mandrel to form a ring; driving the ring of wedges endwise against the beveled shoulder to force their inner ends against the mandrel and simultaneously expanding the outer end of the ring of wedges outwardly against the bell and forming beveled faces on the inner sides thereof at their outer ends; inserting a cast ring of lead having an annular wedge-shaped portion between the outer ends of the wedges and the mandrel; pre-calking the cast lead ring against the outer ends and the beveled faces of the wedges; and pouring molten calking lead into the mouth of the bell against said calked lead ring.

16. That improvement in the described method of forming a pre-calked pipe joint in a bell having an annular shoulder at its base which is characterized by inserting a ring of wooden blocks in the bell; driving the ring of blocks endwise against the shoulder to force their inner ends radially inwardly, and simultaneously expanding the outer ends of the ring of wedges radially outwardly against the bell and forming beveled faces on the inner sides of the wedges at their outer ends.

In testimony, that I claim the foregoing as my own, I have hereto affixed my signature.

JAMES R. McWANE.